(12) United States Patent
Schumacher

(10) Patent No.: US 6,567,843 B1
(45) Date of Patent: May 20, 2003

(54) DIRECTOR-CONTROLLED WEB SESSION

(75) Inventor: James Schumacher, Oakland, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/500,670

(22) Filed: Feb. 9, 2000

(51) Int. Cl.[7] .............................................. G06F 15/16

(52) U.S. Cl. ..................... 709/203; 709/225; 709/227

(58) Field of Search .............................. 709/203, 204, 709/205, 217, 219, 225, 226, 229, 227–228

(56) References Cited

U.S. PATENT DOCUMENTS 5,809,247 A  *  9/1998  Richardson et al. ........ 709/218
6,182,072 B1  *  1/2001  Leak et al. .................. 707/10

OTHER PUBLICATIONS

Developer.com–reference http://documentation.captis.com/files/web_sites/commercial/ccw18wd.htm.*

* cited by examiner

Primary Examiner—Mehmet B. Geckil
(74) Attorney, Agent, or Firm—Harley R. Ball; Steven J. Funk; Kevin D. Robb

(57) ABSTRACT

A director-controlled web server comprises a processing system, an interface, and a screen. Using the screen, the director selects a web site to provide content pages to participating browsers. The interface then receives refresh messages from the participating browsers and transfers the refresh messages to the processing system. The processing system generates responses with a refresh tag and the URL for the currently selected web site. The interface transfers the responses to the participating browsers. The combination of a new web site selection by the director and a refresh by the browser results in a new content page being displayed at the browser. The director-controlled web server may be configured to automatically select web sites, and to change the selection from one web site to another over time.

48 Claims, 4 Drawing Sheets

DIRECTOR-CONTROLLED WEB SESSION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of web servers, and in particular, to a web server that provides a director with control over the web session of a browser.

2. Description of the Prior Art

The World Wide Web (web) has become integral to current entertainment and information industries. A computer-executed browser connects to the web over various types of communication links. Once connected to the web, the browser retrieves a web page from a web site by using a Uniform Resource Locator (URL). The URL is typically selected by the computer user from screen menu. The browser then directs the computer to display the web page.

A web page typically has a refresh tag. The refresh tag specifies a time increment, such a minute, an hour, or a day. When the browser retrieves and displays the web page, the browser decrements the refresh tag until expiration. Upon expiration, the browser retrieves an updated or "refreshed" web page using the same URL.

The browser can open multiple frames under the direction of a web page. For example, the browser typically opens a first frame for the first web page. The first web page can cause the browser to open a second frame, and to retrieve and display a second web page in the second frame.

Unfortunately, most users are unaware of millions of web sites that provide entertaining and informative web pages. Users face a difficult problem when trying to find the web pages they prefer. One solution is a web server called a search engine that a user accesses with their browser. The search engine collects search criteria from the user and searches web site abstracts to generate a list of web sites and associated URLs. The search engine transfers the list to the browser for display. The user selects a web site of interest from the list, and the browser retrieves the corresponding web page using the URL for the web site. Unfortunately, the search may yield a list with hundreds or thousands of web sites. The user is still faced with the problem of hashing through the list.

Another solution is a web server called a push server that a user accesses with their browser. The push server continually downloads web pages and information to the browser for display. Unfortunately, the push server operates based on a script, and is not responsive to dynamic control by a director. In addition, the push server itself must download the web pages and information. A push server with the capacity to handle this task for millions of users becomes cost prohibitive.

Another solution is referred to as "WEB TV". WEB TV downloads URLs along with television programming. By selecting the URL from the TV screen, the associated web page is displayed by the TV. Unfortunately, WEB TV requires the use of television and set-top equipment, and the web pages provided by WEB TV are related to the television program. This relation severely limits the variety information available to the user.

SUMMARY OF THE INVENTION

The invention solves the above problems with a director-controlled web server that controls the web sites accessed by participating browsers. Advantageously, directors with knowledge of the best web sites can effectively guide users on a tour of the web. The director-controlled web server does not require the capacity of a push server and allows directors with complete control in web site selection.

The director-controlled web server-comprises a processing system, an interface, and a screen. Using the screen, the director selects a web site to provide content pages to participating browsers. The interface then receives refresh messages from the participating browsers and transfers the refresh messages to the processing system. The processing system generates responses with a refresh tag and the URL for the currently selected web site. The interface transfers the responses to the participating browsers. The combination of a new web site selection by the director and a refresh by the browser results in a new content page being displayed at the browser. The director-controlled web server may be configured to automatically select web sites, and to change the selection from one web site to another over time.

BRIEF DESCRIPTION OF THE DRAWINGS

The same reference number represents the same element on all drawings.

DETAILED DESCRIPTION

Figure 1:
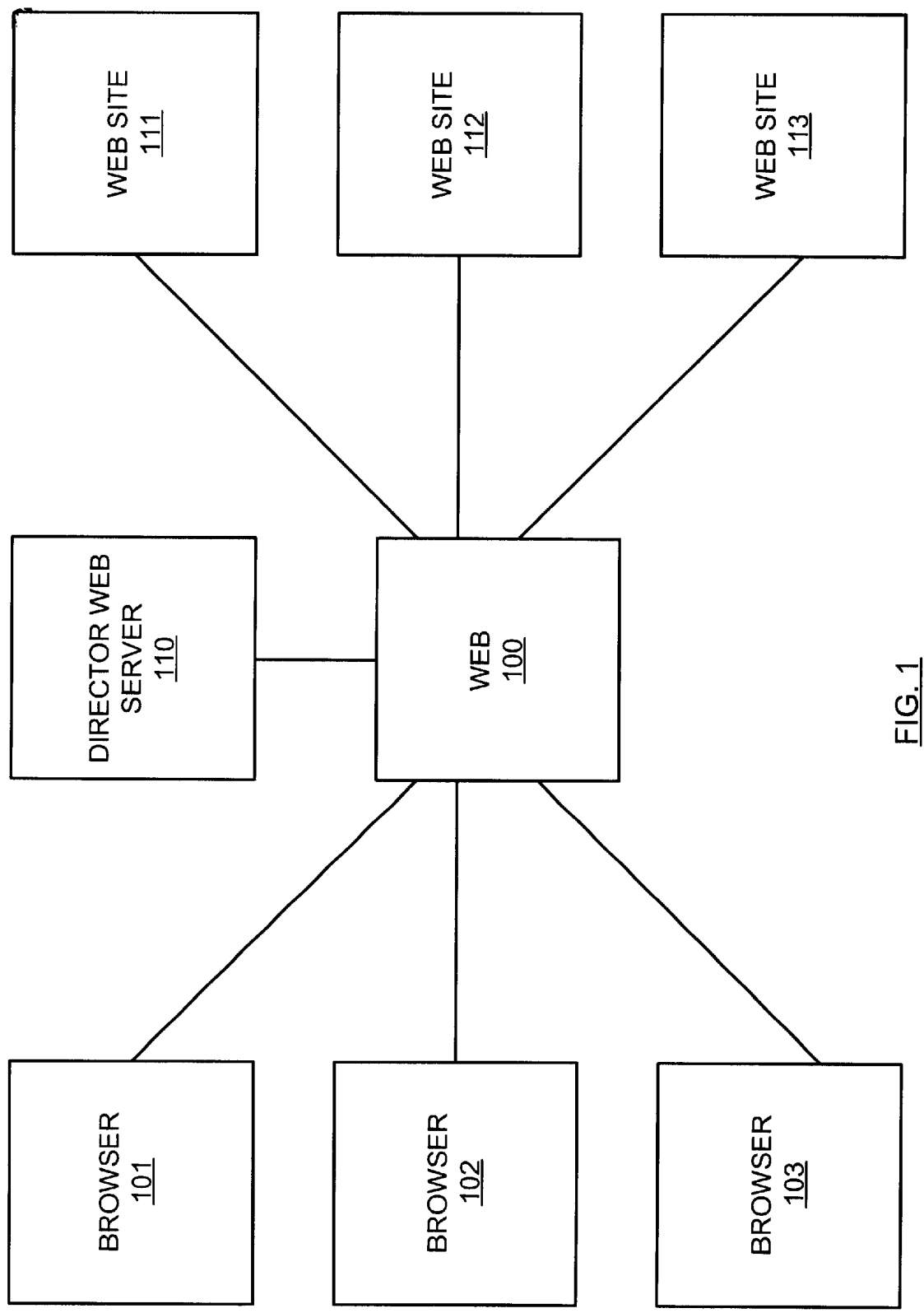
FIG. 1 is a block diagram that illustrates the configuration and operating environment for a director web server in an example of the invention.

System Configuration—FIG. 1

FIG. 1 is a block diagram that illustrates the configuration and operating environment for a director web server 110 that is connected to web 100. The web 100 is connected to browsers 101–103 and web sites 111–113. Aside from the director web server 110, the configuration and operation of these components and their connections could be conventional.

Figure 2:
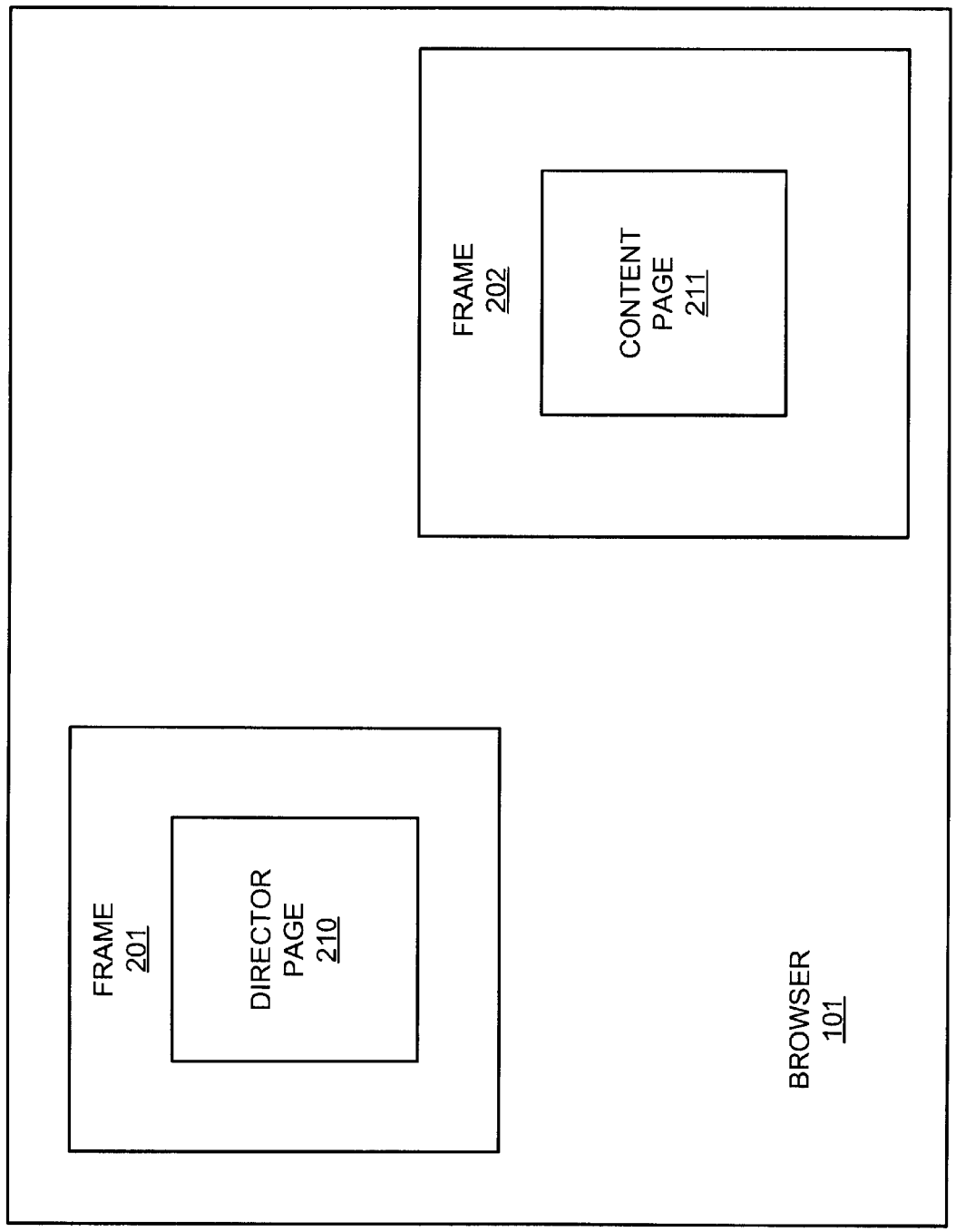
FIG. 2 is a block diagram that illustrates a browser in an example of the invention.

Browser Configuration—FIG. 2

FIG. 2 is a block diagram of the browser 101 in the middle of a director-controlled web session. Browsers 102–103 are similar. The browser 101 has a frame 201 that displays a director page 210. The browser 101 previously obtained the director page 210 from the director web server 110 to initiate the session. The director page 210 then caused the browser 101 to open another frame 202 and to obtain a content page 211 using a web identifier. The frame 211 would typically overlay the frame 210 and display the content page 211. When the refresh tag for the director page 210 specifies, the browser 101 will contact the director web server 110 for a refresh and may obtain an new web identifier. Many such refresh messages may be sent by the browser 101 before a new web identifier is obtained from the director web server 110, but these extraneous, refresh messages are omitted from the following discussion for clarity. When a new web identifier is obtained, the browser 101 will replace the content page 211 with a new content page obtained with the new web identifier. The web identifiers are any information that can be used to access servers on the web 100, and one such web identifier is a URL.

Figure 3:
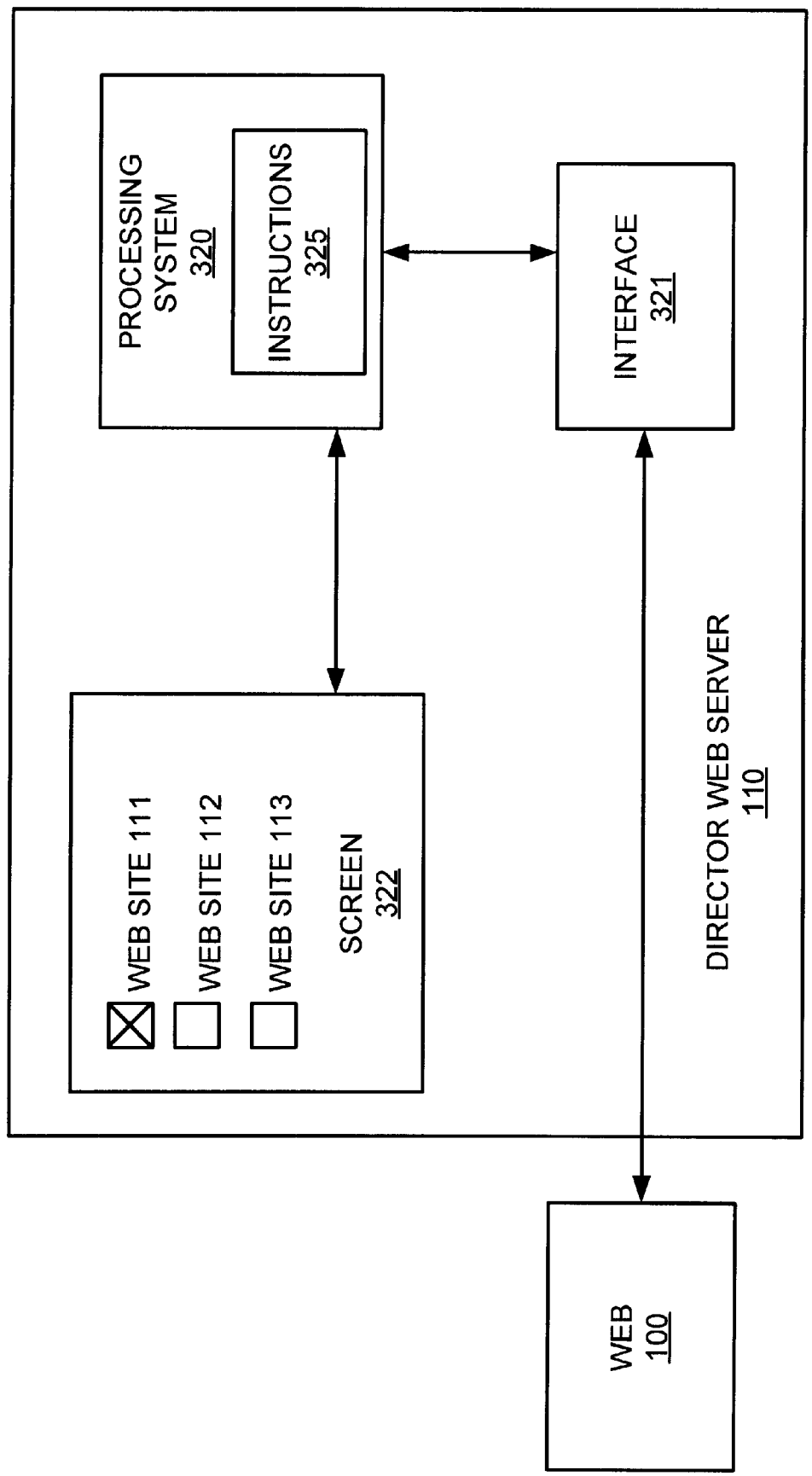
FIG. 3 is a block diagram that illustrates the director web server in an example of the invention.

Director Web Server Configuration—FIG. 3

FIG. 3 is a block diagram that illustrates the director web server 110. The director web server 110 comprises processing system 320, interface 321, and screen 322. Thee processing system 320 is connected to the interface 321 and the screen 322. The processing system 320 stores and executes instructions 325 to control the operation of the director web server 110. The screen 322 displays information indicating the web sites 111–113 with associated selection boxes. The interface 321 is connected to the web 100. Aside from the instructions 325 and the information displayed on the screen 322, the configuration and operation of these components could be conventional.

Using the screen 322, the director selects one of the web sites 111–113 to provide content pages to the participating browsers 101–103. The interface 321 then receives messages from the participating browsers 101–103 and transfers the messages to the processing system 320. The processing system 320 generates responses with the URL for the web site currently selected by the director. The interface 321 transfers the responses to the participating browsers 101–103.

After the director selects a new one of the web sites 111–113 to provide a new content page, the processing system 320 generates responses with the URL for the new web site. Since the processing system 320 continually generates responses to refresh messages, the combination of a new web site selection by the director and a refresh by the browser results in a new content page being displayed at the browser. If the web site selection has not changed since the last refresh, then the same URL is used by the browser. If desired, the instructions 325 may be configured to automatically select web sites, and change the selection over time from one web site to another.

The processing system 320 includes instructions 325 that are stored on storage media. The instructions 325 can be read and executed by a processor. Some examples of instructions 325 are software, program code, and firmware. Some examples of storage media are memory devices, tape, disks, integrated circuits, and servers. The instructions 325 are operational when executed by the processor to direct the processor to operate in accord with the invention. The term "processor" refers to a single processing device or a group of inter-operational processing devices. Some examples of processors are integrated circuits, computers, and logic circuitry. Those skilled in the art are familiar with instructions, processors, and storage media.

Figure 4:
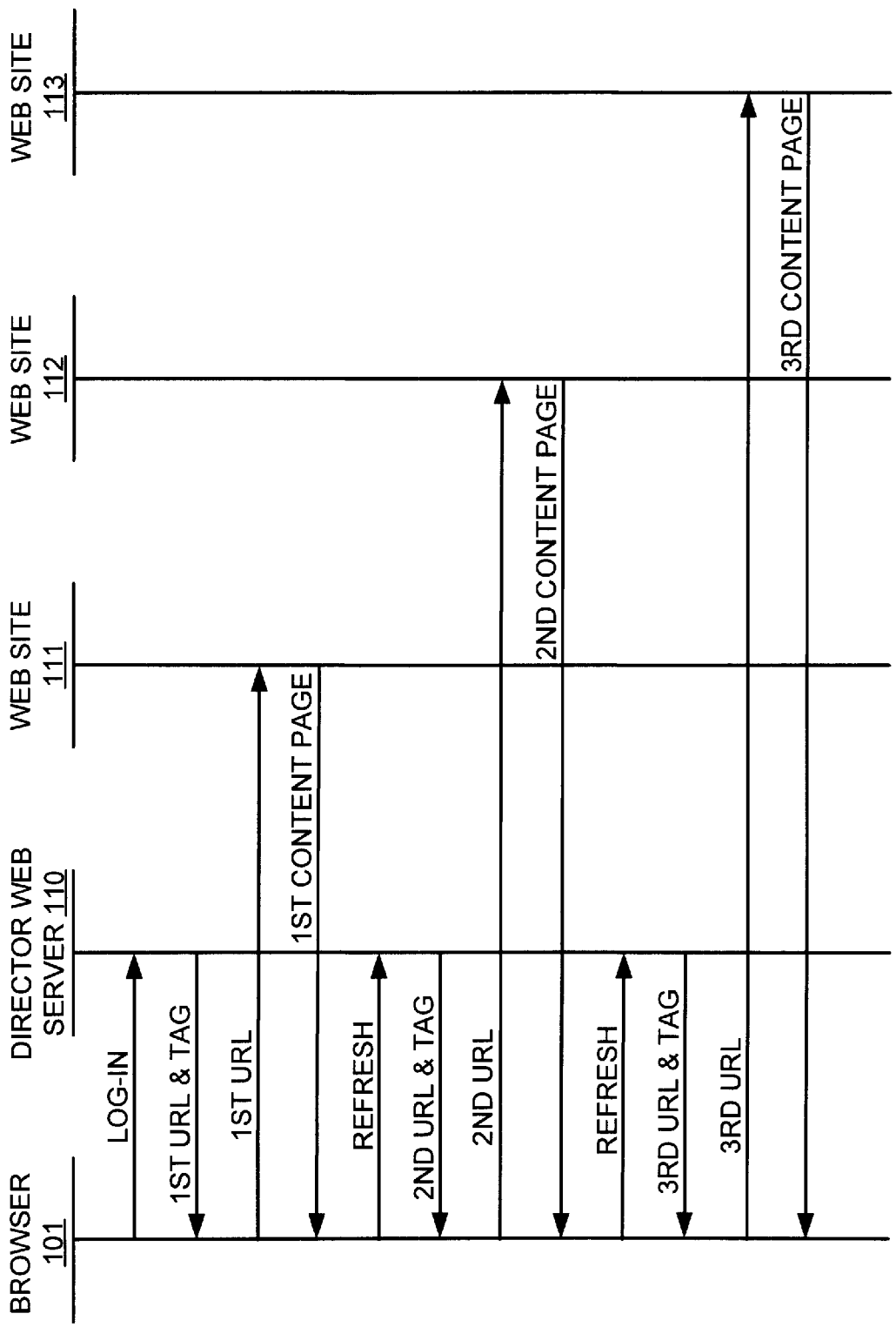
FIG. 4 is a message sequence chart that illustrates the interaction of components for a director-controlled web session.

System Operation—FIG. 4

FIG. 4 is a message.sequence chart that illustrates the interaction between the above-described components for a director-controlled web session. The browser 101 transfers a log-in message using the URL of the director web server 110 to request a director-controlled web session. The director web server 110 responds to the browser. 101 with a message that includes a first URL and a first refresh tag. The web browser 101 then transfers a message with the first URL to the web site 111. The web site 111 responds with a first content page that is displayed by the browser 101.

When the first refresh tag expires, the browser 101 transfers a message with the URL of the director web server 110 to request a refresh. The director web server 110 responds to the browser 101 with a message that includes a second URL and a second refresh tag. The web browser 101 then transfers a message with the second URL to the web site 112. The web site 112 responds with a second content page that is displayed by the browser 101.

When the second refresh tag expires, the browser 101 transfers a message with the URL of the director web server 110 to request a refresh. The director web server 110 responds to the browser 101 with a message that includes a third URL and a third refresh tag. The web browser 101 then transfers a message with the third URL to the web site 113. The web site 113 responds with a third content page that is displayed by the browser 101.

The session continues in this fashion until the browser is shut down or the director web site stops providing additional URLs. If desired, a content web page could include an option to opt out of the session and remain on the current content page. In addition, the other browsers 102–103 could simultaneously interact with the director web server 110 and web sites 111–113 in a similar fashion.

Those skilled in the art will appreciate variations of the above-described embodiment that fall within the scope of the invention. As a result, the invention is not limited to the specific example discussed above, but only by the following claims and their equivalents.

I claim:

1. A method for operating a director-controlled web server, the method comprising:

receiving first message from a browser requesting a director-controlled web session;

in response to the first message, transferring a first response to the browser including a first web identifier and a refresh tag;

receiving a second message from the browser requesting refresh;

in response to the second message, transferring a second response to the browser including a second web identifier;

receiving a third message from the browser requesting refresh; and in response to the third message, transferring a third response to the browser including a third web identifier.

2. The method of claim 1 wherein the first web identifier, the second web identifier, and the third web identifier are different uniform resource locates.

3. The method of claim 1 wherein the first response includes an instruction for the browser to open another frame, and the first web identifier, the second web identifier, and the third web identifier are for the other frame.

4. The method of claim 1 wherein the second response and the third response include refresh tags.

5. The method of claim 1 further comprising displaying a screen indicating first, second, and third web sites corresponding to the first, second, and third web identifiers.

6. The method of claim 4 further comprising receiving a screen selection of the first web site before receiving the first message, and in response, including the first web identifier in the first response.

7. The method of claim 4 further comprising receiving a screen selection of the second web site before receiving the second message, and in response, including the second web identifier in the second response.

8. The method of claim 1 further comprising receiving a plurality of additional messages from the browser requesting refresh, and in response to the additional messages, transferring additional responses to the browser including additional web identifiers.

9. A director-controlled web server comprising:
a processing system configured to process a first message from a browser requesting a director-controlled web session and responsively generate a first response for the browser including a first web identifier and a refresh tag, to process a second message from the browser requesting refresh arid responsively generate a second response for the browser including a second web identifier, and to process a third message from the browser requesting refresh and responsively generate a third response for the browser including a third web identifier; and
an interface coupled to the processing system and configured to receive the first message from the browser and transfer the first response to the browser, to receive the second message from the browser and transfer the second response to the browser, and to receive the third message from the browser and transfer the third response to the browser.

10. The web server of claim 9 wherein the first web identifier, the second web identifier, and the third web identifier are different uniform resource locates.

11. The web server of claim 9 wherein the processing system is configured to responsively generate the first response including an instruction for the browser to open another frame, and the first web identifier, the second web identifier, and the third web identifier are for the other frame.

12. The web server of claim 9 wherein the processing system is configured to responsively generate the second response and the third response to include refresh tags.

13. The web server of claim 9 further comprising a display screen wherein the processing system and the display screen are configured to indicate first, second, and third web sites that correspond to the first, second, and third web identifiers.

14. The web server of claim 13 wherein the processing system is configured to process a screen selection of the first web site before processing the first message, and in response, to include the first web identifier in the first response.

15. The web server of claim 13 wherein the processing system is configured to process a screen selection of the second web site before processing the second message, and in response, to include the second web identifier in the second response.

16. The web server of claim 9 wherein:
the processing system is configured top process a plurality of additional messages from the browser requesting refresh and responsively generate additional responses for the browser including additional web identifiers; and
the interface is configured to receive the additional messages from the browser and to transfer the additional responses to the browser.

17. A product comprising a processor-readable storage medium storing processor-executable instructions for performing the following method for providing a director-controlled web session, the method comprising:
receiving first message from a browser requesting a director-controlled web session;
in response to the first message, transferring a first response to the browser including a first web identifier and a refresh tag;
receiving a second message from the browser requesting refresh;
in response to the second message, transferring a second response to the browser including a second web identifier;
receiving a third message from the browser requesting refresh; and
in response to the third message, transferring a third response to the browser including a third web identifier.

18. The product of claim 17 wherein the first web identifier, the second web identifier, and the third web identifier are different uniform resource locates.

19. The product of claim 17 wherein the first response includes an instruction for the browser to open another frame, and the first web identifier, the second web identifier, and the third web identifier are for the other frame.

20. The product of claim 17 wherein the second response and the third response include refresh tags.

21. The product of claim 17 further comprising directing a display screen to indicate first, second, and third web sites corresponding to the first, second, and third web identifiers.

22. The product of claim 21 further comprising receiving a screen selection of the first web site before receiving the first message, and in response, including the first web identifier in the first response.

23. The product of claim 21 further comprising receiving a screen selection of the second web site before receiving the second message, and in response, including the second web identifier in the second response.

24. The product of claim 17 further comprising receiving a plurality of additional messages from the browser requesting refresh, and in response to the additional messages, transferring additional responses to the browser including additional web identifiers.

25. A method for operating a director-controlled web server, the method comprising:
receiving a plurality of first messages from a plurality of browsers requesting a plurality of director-controlled web sessions;
in response to the first messages, transferring first responses to the browsers including a first web identifier and a refresh tag;
receiving a plurality of second messages from the browsers requesting refresh;
in response to the second messages, transferring second responses to the browsers including a second web identifier;
receiving a plurality of third messages from the browsers requesting refresh; and
in response to the third messages, transferring third responses to the browsers including a third web identifier.

26. The method of claim 25 wherein the first web identifier, the second web identifier, and the third web identifier are different uniform resource locates.

27. The method of claim 25 wherein the first responses include an instruction for the browsers to open another frame, and the first web identifier, the second web identifier, and the third web identifier are for the other frame.

28. The method of claim 25 wherein the second response and the third response include refresh tags.

29. The method of claim 25 further comprising displaying a screen indicating first, second, and third web sites corresponding to the first, second, and third web identifiers.

30. The method of claim 29 further comprising receiving a screen selection of the first web site before receiving the first messages, and in response, including the first web identifier in the first responses.

31. The method of claim 29 further comprising receiving a screen selection of the second web site before receiving the second messages, and in response, including the second web identifier in the second responses.

32. The method of claim 25 further comprising receiving a plurality of additional messages from the browsers requesting refresh, and in response to the additional messages, transferring additional responses to the browsers including additional web identifiers.

33. A director-controlled web server comprising:

a processing system configured to process a plurality of first message from a plurality of browsers requesting a plurality of director-controlled web sessions and responsively generate first responses for the browsers including a first web identifier and a refresh tag, to process a plurality of second messages from the browsers requesting refresh and responsively generate second responses for the browsers including a second web identifier, and to process a plurality of third messages from the browsers requesting refresh and responsively generate third responses for the browsers including a third web identifier; and an interface coupled to the processing system and configured to receive the first messages from the browsers and transfer the first responses to the browsers, to receive the second messages from the browsers and transfer the second responses to the browsers, and to receive the third messages from the browsers and transfer the third responses to the browsers.

34. The web server of claim 33 wherein the first web identifier, the second web identifier, and the third web identifier are different uniform resource locates.

35. The web server of claim 33 wherein the processing system is configured to responsively generate the first responses including an instruction for the browsers to open another frame, and the first web identifier, the second web identifier, and the third web identifier are for the other frame.

36. The web server of claim 33 wherein the processing system is configured to responsively generate the second responses and the third responses to include refresh tags.

37. The web server of claim 33 further comprising a display screen wherein the processing system and the display screen are configured to indicate first, second, and third web sites that correspond to the first, second, and third web identifiers.

38. The web server of claim 37 wherein the processing system is configured to process a screen selection of the first web site before processing the first messages, and in response, to include the first web identifier in the first responses.

39. The web server of claim 37 wherein the processing system is configured to process a screen selection of the second web site before processing the second messages, and in response, to include the second web identifier in the second responses.

40. The web server of claim 33 wherein:

the processing system is configured to process a plurality of additional messages from the browsers requesting refresh and responsively generate additional responses for the browsers including additional web identifiers; and the interface is configured to receive the additional messages from the browsers and to transfer the additional responses to the browsers.

41. A product comprising a processor-readable storage medium storing processor-executable instructions for performing the following method for providing a director-controlled web session, the method comprising:

receiving a plurality of first messages from a plurality of browsers requesting a plurality of director-controlled web sessions;

in response to the first messages, transferring first responses to the browsers including a first web identifier and a refresh tag;

receiving a plurality of second messages from the browsers requesting refresh;

in response to the second messages, transferring second responses to the browsers including a second web identifier;

receiving a plurality of third messages from the browsers requesting refresh; and in response to the third messages, transferring third responses to the browsers including a third web identifier.

42. The product of claim 41 wherein the first web identifier, the second web identifier, and the third web identifier are different uniform resource locates.

43. The product of claim 41 wherein the first responses include an instruction for the browsers to open another frame, and the first web identifier, the second web identifier, and the third web identifier are for the other frame.

44. The product of claim 41 wherein the second responses and the third responses include refresh tags.

45. The product of claim 41 further comprising directing a display screen to indicate first, second, and third web sites corresponding to the first, second, and third web identifiers.

46. The product of claim 45 further comprising receiving a screen selection of the first web site before receiving the first messages, and in response, including the first web identifier in the first responses.

47. The product of claim 45 further comprising receiving a screen selection of the second web site before receiving the second messages, and in response, including the second web identifier in the second responses.

48. The product of claim 41 further comprising receiving a plurality of additional messages from the browsers requesting refresh, and in response to the additional messages, transferring additional responses to the browsers including additional web identifiers.

* * * * *